United States Patent
Hendry et al.

(10) Patent No.: US 9,935,861 B2
(45) Date of Patent: Apr. 3, 2018

(54) METHOD, SYSTEM AND APPARATUS FOR DETECTING INSTANT MESSAGE SPAM

(71) Applicant: Kik Interactive Inc., Waterloo (CA)

(72) Inventors: Daniel Ian Hendry, Waterloo (CA); Christopher Aaron Fairles, Waterloo (CA)

(73) Assignee: KIK INTERACTIVE INC., Waterloo (CA)

( * ) Notice: Subject to any disclaimer, the term of this patent is extended or adjusted under 35 U.S.C. 154(b) by 208 days.

(21) Appl. No.: 14/939,321

(22) Filed: Nov. 12, 2015

(65) Prior Publication Data

US 2016/0142275 A1    May 19, 2016

Related U.S. Application Data

(60) Provisional application No. 62/079,687, filed on Nov. 14, 2014.

(51) Int. Cl.
| | |
|---|---|
| *G06F 15/16* | (2006.01) |
| *H04L 12/26* | (2006.01) |
| *H04L 29/06* | (2006.01) |
| *H04L 12/58* | (2006.01) |

(52) U.S. Cl.
CPC ........ *H04L 43/0894* (2013.01); *H04L 43/028* (2013.01); *H04L 43/062* (2013.01); *H04L 43/16* (2013.01); *H04L 51/04* (2013.01); *H04L 51/12* (2013.01); *H04L 63/14* (2013.01)

(58) Field of Classification Search
CPC . H04L 43/0894; H04L 43/028; H04L 43/062; H04L 43/16; H04L 51/04; H04L 51/12; H04L 63/14
USPC .................................................. 709/203, 224
See application file for complete search history.

(56) References Cited

U.S. PATENT DOCUMENTS

| | | | | |
|---|---|---|---|---|
| 9,270,626 | B1 * | 2/2016 | O'Connor | H04L 67/02 |
| 2008/0016167 | A1 * | 1/2008 | Lund | G06Q 10/107 |
| | | | | 709/206 |
| 2008/0196104 | A1 * | 8/2008 | Tuvell | H04L 51/12 |
| | | | | 726/24 |
| 2012/0210420 | A1 * | 8/2012 | Rybalko | H04L 51/12 |
| | | | | 726/22 |

* cited by examiner

*Primary Examiner* — Frantz Jean
(74) *Attorney, Agent, or Firm* — Perry + Currier Inc.

(57) ABSTRACT

A system including a metrics server and a messaging server is provided. The metrics server receives traffic data describing instant messages sent via the messaging server, and from the traffic data generates and updates suspicion indices corresponding to the computing devices that sent the messages. The suspicion indices are passed to the messaging server, which can modify its handling of subsequent messages based on the suspicion indices of the senders.

16 Claims, 4 Drawing Sheets

METHOD, SYSTEM AND APPARATUS FOR DETECTING INSTANT MESSAGE SPAM

FIELD

The specification relates generally to instant messaging, and specifically to a method, system and apparatus for detecting instant message spam.

BACKGROUND

The use of instant messaging, particularly in connection with mobile computing devices such as smart phones, has risen in popularity recently. Unsolicited messages, also referred to as messaging spam or "spim", have also become commonplace, being generated and sent automatically by malicious messaging clients on servers or compromised home computers or smart phones (e.g. botnets). Such messages lead to undesirable wasting of computational resources of instant messaging providers as well as their client devices.

Some established spam-detection methodologies are difficult to apply to instant messaging spam, particularly in instant messaging networks that provide end-to-end encryption which prevents the inspection of message content and the application of techniques such as Bayesian filtering. As a result, current approaches to messaging spam detection may be ineffective, make inefficient use of computational resources, or both.

BRIEF DESCRIPTIONS OF THE DRAWINGS

Embodiments are described with reference to the following figures, in which.

DETAILED DESCRIPTION OF THE EMBODIMENTS

Figure 1:
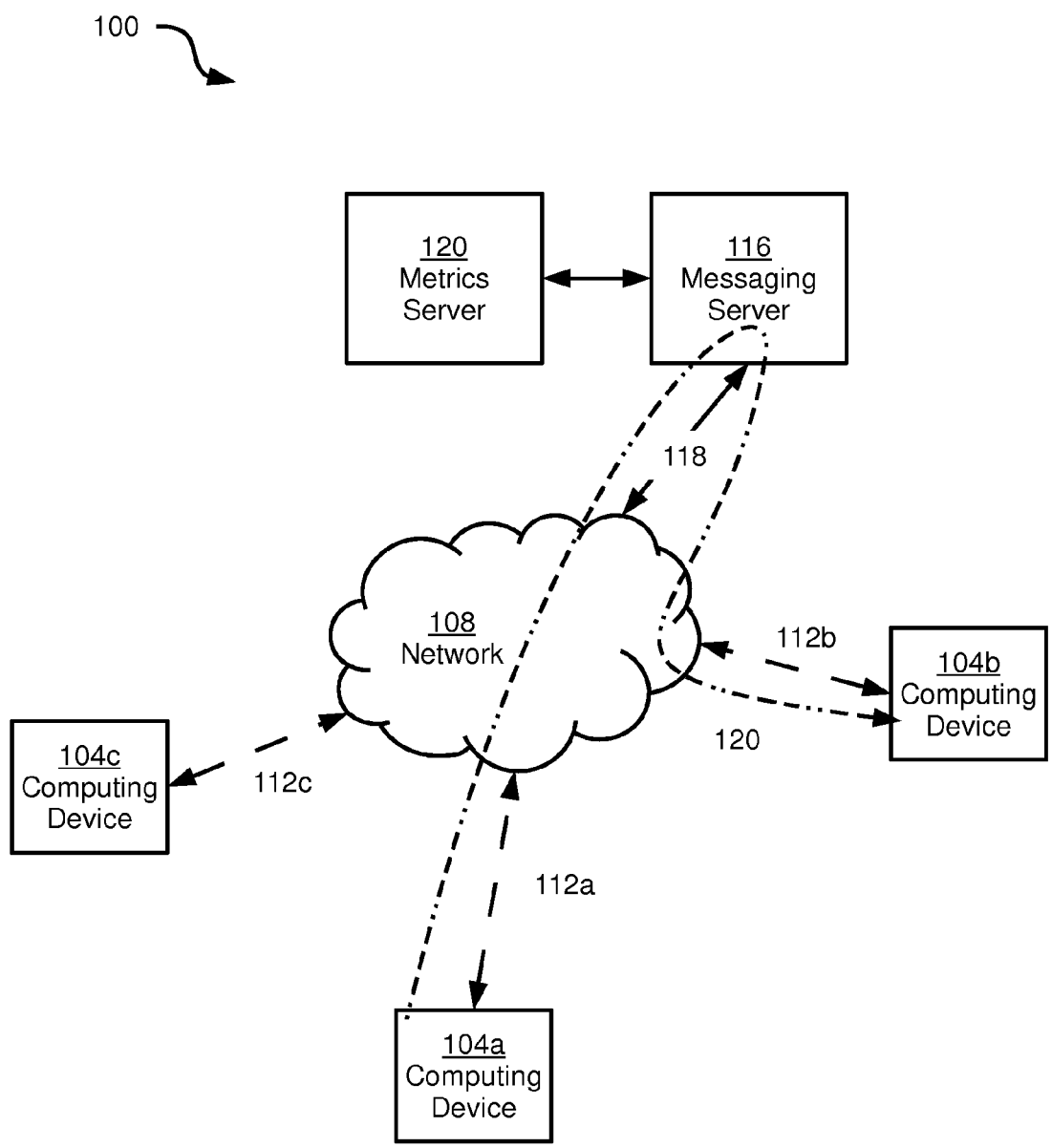
FIG. 1 depicts a communication system, according to a non-limiting embodiment.

FIG. 1 depicts a communications system 100. System 100 includes a plurality of computing devices, of which three examples 104a, 104b and 104c are shown (referred to generically as a computing device 104, and collectively as computing devices 104). Additional computing devices (not shown) can be included in system 100. Each computing device 104 can be any of a cellular phone, a smart phone, a tablet computer, a desktop computer, and the like.

Computing devices 104 are connected to a network 108 via respective links 112a and 112b, which are illustrated as wireless links but can also be wired links, or any suitable combination of wired and wireless links. Network 108 can include any suitable combination of wired and wireless networks, including but not limited to a Wide Area Network (WAN) such as the Internet, a Local Area Network (LAN) such as a corporate data network, cell phone networks, WiFi networks, WiMax networks and the like.

Via network 108, computing devices 104 can communicate with a messaging server 116 connected to network 108 via a link 118. Messaging server 116 provides an instant messaging (IM) service to computing devices 104. For example, computing devices 104 can each execute an IM application for exchanging instant messages via messaging server 116. Thus, as shown by message path 120, computing device 104a transmits a message addressed to an account associated with computing device 104b, to messaging server 116, and messaging server 116 routes the message to computing device 104b. Messages need not be limited to a single addressee; for example, another message (not shown) sent by computing device 104a may be addressed to an account associated with computing device 104b and an account associated with computing device 104c.

System 100 also includes a metrics server 120 connected to messaging server 116. Metrics server 120 may be connected to messaging server 116 via network 108, or via another network (not shown). In some embodiments, metrics server 120 and messaging server 116 may be integrated into a single physical server that executes the functions of metrics server 120 and messaging server 116 described herein. Metrics server 120 receives message traffic data from messaging server 116. As will be seen below, traffic data received at metrics server may take a variety of forms, and generally describes the message traffic routed by messaging server 116 (e.g. sending and receiving accounts and IP addresses, the time messages were sent and the like). In the preferred embodiments, the traffic data does not include message content.

Thus, messaging server 116 operates to route instant messages between computing devices 104 via network 108, and to provide traffic data describing the routed messages to metrics server 120. It will now be apparent to those skilled in the art that some of the messages routed by messaging server 116 may be spam messages. Spam messages may be defined by a variety of characteristics, but generally include messages that are undesirable to their recipients. In addition, spam messages are distinguished from non-spam messages in that rather than being generated and sent via direct user input at a computing device running an IM application, the generation and transmission of spam messages are at least partly automated; in other words, the senders of spam messages may be referred to as spambots. As will be seen below, messages may have additional characteristics that indicate that they are likely spam messages. Metrics server 120 is configured, based on the traffic data received from messaging server 116, to generate a suspicion index (SI) corresponding to at least one account, indicating the likelihood that account engages in sending spam messages. Various actions can be taken by one or both of metrics server 120 and messaging server 116 in relation to accounts with elevated SI values.

Figure 2:
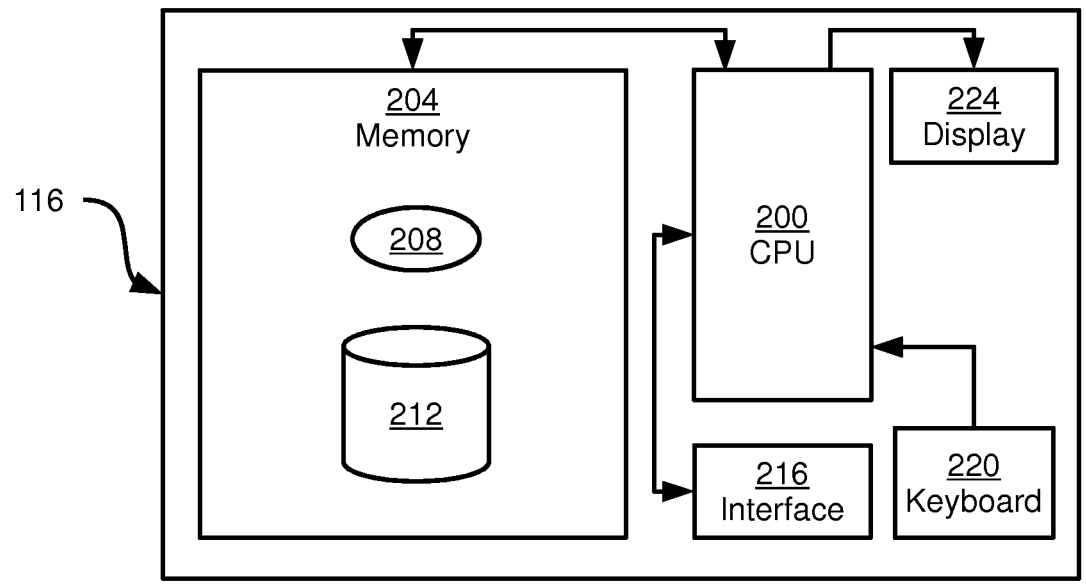
FIG. 2 depicts internal components of the messaging server and the metrics server of the system of FIG. 1, according to a non-limiting embodiment.
Figure 2:
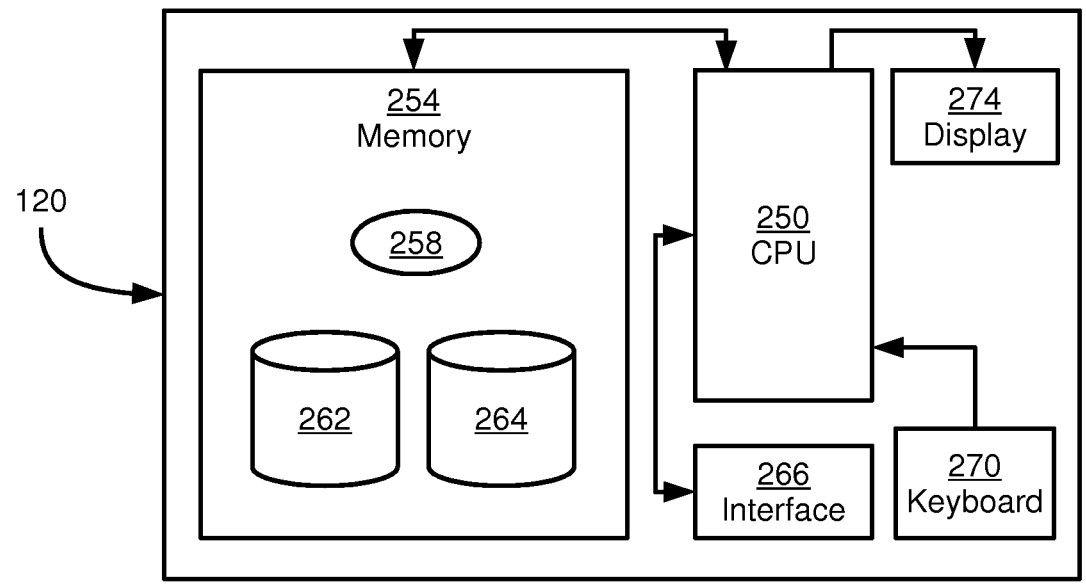

Before a detailed discussion of the operation of system 100 is provided, certain components of messaging server 116 and metrics server 120 will be described with reference to FIG. 2.

Messaging server 116 includes a central processing unit (CPU) 200, also referred to herein as processor 200, interconnected with a memory 204. Memory 204 stores computer readable instructions executable by processor 200, including a routing application 208. Processor 200 and memory 204 are generally comprised of one or more integrated circuits (ICs), and can have a variety of structures, as will now occur to those skilled in the art (for example, more than one CPU can be provided). Processor 200 executes the instructions of routing application 208 to perform, in conjunction with the other components of messaging server 116, various functions related to routing messages between computing devices 104 and providing traffic data to metrics server 120. In the discussion below of those functions, messaging server 116 is said to be configured to perform those functions, or to be operating to perform those functions—it will be understood that messaging server 116 is so configured via the processing of the instructions in application 208 by the hardware components of messaging server 116 (including processor 200 and memory 204).

Memory 204 can store various data used to establish connections with computing devices 104 and route messages between computing devices 104. Such data may include any one of, or any combination of, account names, communication device identifiers such as phone numbers, network addresses for computing devices 104 such as IP addresses, timestamps and the like. In some embodiments, the above data is not stored persistently by messaging server, but rather is stored only as long as necessary to route a message and provide traffic data to metrics server 120. In other embodiments, the above data may be stored persistently at messaging server 116.

In addition, memory 204 can store a message handling database 212 containing, for each of a plurality of account identifiers and network addresses, SI values received from metrics server 120. As will be described in greater detail below, the SI values are employed by processor 200 to detect potential spam messages and alter their routing.

Messaging server 116 also includes a network interface 216 interconnected with processor 200, which allows messaging server 116 to connect to network 108 via link 118. Network interface 216 thus includes the necessary hardware, such as network interface controllers and the like, to communicate over link 118. Messaging server 116 can also include input devices interconnected with processor 200, such as a keyboard 220, as well as output devices interconnected with processor 200, such as a display 224. Other input and output devices (e.g. a mouse, speakers) can also be connected to processor 200. In some embodiments (not shown), keyboard 220 and display 224 can be connected to processor 200 via network 108 and another computing device. In other words, keyboard 220 and display 224 can be local (as shown in FIG. 2) or remote.

Metrics server 120 includes a central processing unit (CPU) 250, also referred to herein as processor 250, interconnected with a memory 254. Memory 254 stores computer readable instructions executable by processor 250, including a spambot detection application 258. Processor 250 and memory 254 are generally comprised of one or more ICs, and can have a variety of structures (for example, more than one CPU can be provided). Processor 250 executes the instructions of application 258 to perform, in conjunction with the other components of metrics server 120, various functions related to processing traffic data received from messaging server 116 and providing SI values to messaging server 116. In the discussion below of those functions, metrics server 120 is said to be configured to perform those functions, or to be operating to perform those functions—it will be understood that metrics server 120 is so configured via the processing of the instructions in application 258 by the hardware components of metrics server 120 (including processor 250 and memory 254).

Memory 254 can also store message traffic data received from messaging server 116 in a database 262. In addition, memory 254 can store a message handling database 264 containing computed values of suspicion indices for accounts, IP addresses, or both.

Metrics server 120 also includes a network interface 266 interconnected with processor 250, which allows metrics server 120 to connect to network 108, messaging server 116, or both. Network interface 266 thus includes the necessary hardware, such as network interface controllers and the like, to communicate with other computing devices over suitable networks. Metrics server 120 can also include input devices interconnected with processor 250, such as a keyboard 270, as well as output devices interconnected with processor 250, such as a display 274. Other input and output devices (e.g. a mouse, speakers) can also be connected to processor 250. In some embodiments (not shown), keyboard 270 and display 274 can be connected to processor 250 via network 108 and another computing device.

As will be described in greater detail below, messaging server 116 can be configured to provide message traffic data to metrics server 120, which in turn can be configured to generate suspicion indices for individual accounts linked to communication devices 104 and for IP addresses from which communication devices 104 send and receive messages. Metrics server 120 can return the SIs to messaging server 116, and messaging server 116 can be configured to assess the suspicion indices and, if any rise above certain predefined thresholds, to initiate various actions, such as altering the delivery of messages for a certain account.

Figure 3:
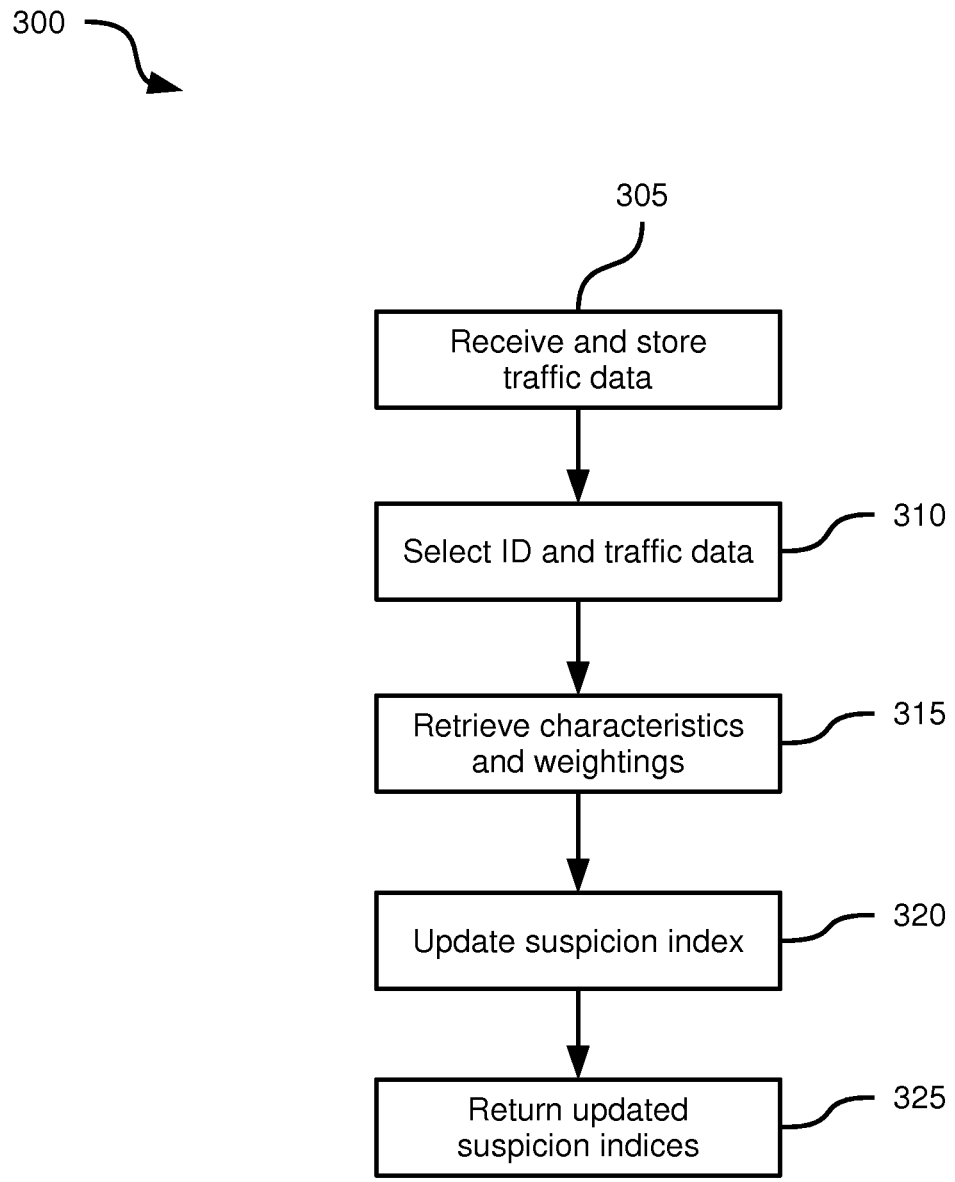
FIG. 3 depicts a method of detecting spambots, according to a non-limiting embodiment.

Turning now to FIG. 3, a method 300 of detecting spambots is illustrated. Method 300 will be described in conjunction with its performance on system 100, although it is contemplated that method 300 could also be performed on other suitable systems. The blocks in method 300 are performed by metrics server 120, via the execution of detection application 258 by processor 250.

Beginning at block 305, metrics server 120 receives traffic data from messaging server 116 and stores the traffic data in memory 254 (specifically, in database 262). The nature of the traffic data is not particularly limited. In general, the traffic data includes indications, for each message described in the traffic data, of a sender account, one or more destination accounts, and a network address (e.g. an IP address) corresponding to at least the sender account. Thus, for a message sent from an account associated with communication device 104a, the network address may be the IP address of communication device 104a in network 108. In other examples, the network address may be the IP address of an access point, such as a WiFi access point, through which communication device 104a connects to network 108.

Other information may also be included in the traffic data. For example the traffic data can include one or both of a word count and a character count for each message. As a further example, the traffic data can include timestamps identifying the date and time at which each message was sent. In still other examples, traffic data can include indications of how many distinct destinations returned an indication to messaging server 116 that a message was considered spam by their users. Other traffic data parameters will also occur to those skilled in the art.

For example, traffic data can also include a client version number indicating the version of the IM application executing at the computing device 104 that sent the relevant message. Traffic data can also include device related data containing any combination of a battery level, available memory (e.g. available RAM), the type and version of the sending computing device 104's operating system, a model identifier (e.g. Samsung Galaxy 5, iPad, etc). Traffic data can also include device characterization data for the sending computing device 104 containing any combination of device uptime, a connection type (e.g. cellular or WiFi), a reported number of processor cores, and the like. In addition, traffic data can include a cryptographic response from the sending computing device 104; for example, in some embodiments computing devices 104 and messaging server 116 can share a key pair, and messaging server 116 can request that the sending computing device 104 sign and return a message.

The timing of the receipt of traffic data at block 305 is also not limited. Messaging server 116 can be configured to provide traffic data to metrics server 120 for individual messages, whether immediately upon delivery of a message or at a predefined time after delivery. In other embodiments, messaging server 116 can be configured to collect traffic data for a predefined period of time since the previous provision of traffic data to metrics server 120, and thus transmit traffic data for a plurality of messages to metrics server 120. Other examples of the scheduling of traffic data transmissions will also occur to those skilled in the art (e.g. based on the computational load imposed on messaging server 116).

A simplified example of database 262 following the performance of block 305 is shown below.

TABLE 1

Example Traffic Data

| Sender Account | Sender IP Address | Destination Account | Time Sent |
|---|---|---|---|
| 104a | 1.2.3.4 | 104b | Jul. 3, 2014 1:00 pm |
| 104b | 5.6.7.8 | 104a | Jul. 3, 2014 1:01 pm |
| 104c | 2.3.4.5 | 104a | Jul. 3, 2014 1:38 pm |
| 104c | 2.3.4.5 | 104b | Jul. 3, 2014 1:38 pm |
| 104c | 2.3.4.5 | X1 | Jul. 3, 2014 1:38 pm |
| 104c | 2.3.4.5 | X2 | Jul. 3, 2014 1:38 pm |
| 104c | 2.3.4.5 | X3 | Jul. 3, 2014 1:38 pm |

The tabular format shown above, as well as the format of the account identifiers, network addresses and timestamps, are provided simply for illustration. Other formats for storing the traffic data may be employed, and the information in the traffic data may be formatted in a variety of ways that will occur to those skilled in the art. In addition, it will be noted that many of the sender and destination account identifiers shown above match the identifiers of communication devices 104 shown in FIG. 1. This is for illustrative purposes only: more than one account may be used in connection with a given communication device 104, and the same account may be used to send messages from more than one communication device 104. Thus, account identifiers need not bear any resemblance to identifiers of communication devices (e.g. phone numbers, serial numbers, and the like).

At block 310 of method 300, metrics server 120 is configured to select an identifier and associated traffic data (that is, records in database 262 that contain the selected identifier). In the context of block 310, an "identifier" is either an account identifier or a network address. The selection of an identifier may be performed in any of a variety of ways. For example, metrics server 120 may be configured to repeat the performance of method 300, or portions thereof, for each account identifier and each network address present in database 262 by selecting the identifiers in succession. In other examples, metrics server 120 may be configured to select an identifier from database 262 at random. In still other examples, multiple performances of method 300 may be performed in parallel, and thus metrics server 120 may simultaneously select a plurality of identifiers and perform subsequent portions of method 300 for each selected identifier. In the present example performance of method 300, it will be assumed that the identifier selected at block 310 is the account identifier "104c". The traffic data retrieved at block 315 therefore consists of the final five records of Table 1 shown above, each of which contains the selected identifier.

It is contemplated that the traffic data selected at block 310 need not be limited to the most recently received traffic data (that is, the most recent performance of block 305). Metrics server 120 may be configured to store traffic data for any length of time after receipt, and thus database 262 may contain older traffic data in addition to that received at block 305. Such older traffic data may also be selected at block 310.

At block 315, metrics server 120 can be configured to retrieve spam detection characteristics and corresponding weightings from memory 254. The characteristics each define a condition that, if satisfied by the traffic data selected at block 310, results in the corresponding weighting being applied to a suspicion index for the identifier selected at block 310.

A wide variety of characteristics may be maintained by memory 120. Examples of the characteristics will be discussed below in connection with the performance of block 320.

At block 320, metrics server 120 is configured to update a suspicion index corresponding to the identifier selected at block 310. In general the performance of block 320 includes determining whether the traffic data selected at block 310 matches any of the characteristics retrieved at block 315 (e.g. whether the selected traffic data meets any of the conditions specified by the characteristics); and when that determination is affirmative, applying the weighting corresponding to the matched characteristic to the suspicion index of the selected identifier. Example characteristics and the conditions they define are described below.

Message Frequency:

matched when the selected identifier has sent a predefined number of messages to distinct destinations within a predefined time period (e.g. one thousand messages originating from a single account to distinct destinations within one minute).

A variation of this characteristic may be matched when a selected network address has sent at least a predefined number of registration requests attempting to register new account identifiers to messaging server 116 in a predefined period of time. Such requests, when frequent enough, may indicate attempts to register large numbers of spamming accounts or attempts to determine whether a number of account identifiers are already in use (and therefore not available for registration, but available to receive spam).

Another variation of the above characteristic may be matched when a selected network address has sent at least a predefined number of lookup requests for a given other identifier (that is, requests attempting to establish contact with the other identifier) in a predefined period of time.

Shared Network Address:

matched when a predefined number of different account identifiers have sent messages from a given network address selected at block 310 over a predefined period of time. In some examples, this characteristic may also affect the SI of each individual account identifier using the selected network address.

Shared Account Identifier:

matched when a given account identifier selected at block 310 has sent messages from a predefined number of different network addresses in a predefined period of time (this may indicate the use of a botnet). In some examples, there may be an additional condition that the different network addresses be separated by a predefined geographical distance.

Spam Reports:

matched when a given identifier selected at block 310 has sent one or more messages that have led to the receipt by messaging server 116 of a predefined number of spam reports from the destinations of those messages.

Known Spam Identifiers:

matched when a given identifier selected at block 310, generally a network address, is equal to one of a list of known spam identifiers (e.g. IP addresses known to be associated with a botnet) maintained in memory 254.

Inferred Identical Content:

matched when a predefined number of messages sent from the selected identifier have the same character or word counts.

Activity History:

matched when the selected identifier exhibits a predefined pattern of activity (for example, a period of inactivity of at least a predefined length, followed by transmission of at least a predefined number of messages in a certain period of time).

Connection Strength with Other Identifiers:

matched when the identifier selected at block 310 has exchanged a predefined number of messages with another particular identifier (that is, both sent and received at least a predefined number of messages). This may be indicative of a "strong" connection between identifiers, characterized by ongoing exchanges of messages between the relevant identifiers that are unlikely to contain spam. This characteristic may be matched multiple times, once with each other identifier that has exchanged the requisite number of messages with the selected identifier. Alternatively, this characteristic may be matched when the selected identifier has not exchanged the predefined number of messages with another particular identifier, indicating that the selected identifier's connection to the other identifier is "weak".

Malicious Web Content:

Messaging server 116 may be configured to route messages containing web pages (e.g. HTML documents), in addition to other instant messages. Metrics server 120 may maintain a blacklist of URLs identifying malicious HTML documents, and this characteristic may therefore be matched if a message is sent containing a webpage having a blacklisted URL.

Client Version Numbers:

As noted earlier, traffic data for a given message can include the version number of the IM application used to transmit the message. Metrics server 120, at block 320, can be configured to compare the client version numbers contained in the traffic data selected at block 310 to a list of version numbers stored in memory 254, and generate a match for this criterion when a client version number does not match any of the numbers in the list. Applications generating spam messages may report non-existent version numbers when sending messages.

Having determined which characteristics are present in the traffic data selected at block 310, for the identifier selected at block 310, metrics server 120 is configured to apply the weightings corresponding to the matched characteristics to determine a suspicion index for the selected identifier. Various processes may be implemented for applying weightings. In the present example, weightings are contemplated as being values between −1 and 1. In some embodiments, only positive weightings may be employed—that is, the SI of any given identifier may only increase, and not decrease, as a result of the performance of method 300.

Applying weightings in the present example is performed by multiplying the weighting of each matched characteristic by the remainder of 1 minus the previous weightings. For example, if three weightings, W1, W2 and W3 are to be applied, the resulting SI would be obtained by: $W1*(1-0)+W2*(1-W1)+W3*(1-(W1+W2*(1-W1)))$. Thus, if $W1=0.5$, $W2=0.2$ and $W3=0.25$, the resulting SI would be 0.7. As will now be apparent to those skilled in the art, negative weightings would result in negative contributions to the SI, while positive weightings result in positive contributions to the SI. Further, the resulting SI has a value between −1 and 1, with −1 indicating a low probability that the corresponding identifier is a spammer, and 1 indicating a high probability that the corresponding identifier is a spammer.

Various other methods of determining an SI will also occur to those skilled in the art in light of the above. The weightings mentioned above may be set manually by an operator of metrics server 120, or may be determined by automated or semi-automated machine learning techniques. For example, metrics server 120 (or a separate computing device not shown in FIG. 1) may be provided with the above characteristics and with a training set messages from known spamming accounts and network addresses. Using known machine learning techniques, metrics server 120 may then determine the relative importance of each characteristic in determining whether a given account identifier or network address sends spam.

Having determined an updated SI for the identifier selected at block 310, metrics server 120 is configured to store the updated SI in database 264 and return the SI to messaging server 116. As mentioned above, method 300 may be repeated for other identifiers, and metrics server 120 may therefore be configured to wait until SIs for a set, or even all, of the identifiers in traffic database 262 have been computed before sending the SIs to messaging server 116.

Figure 4:
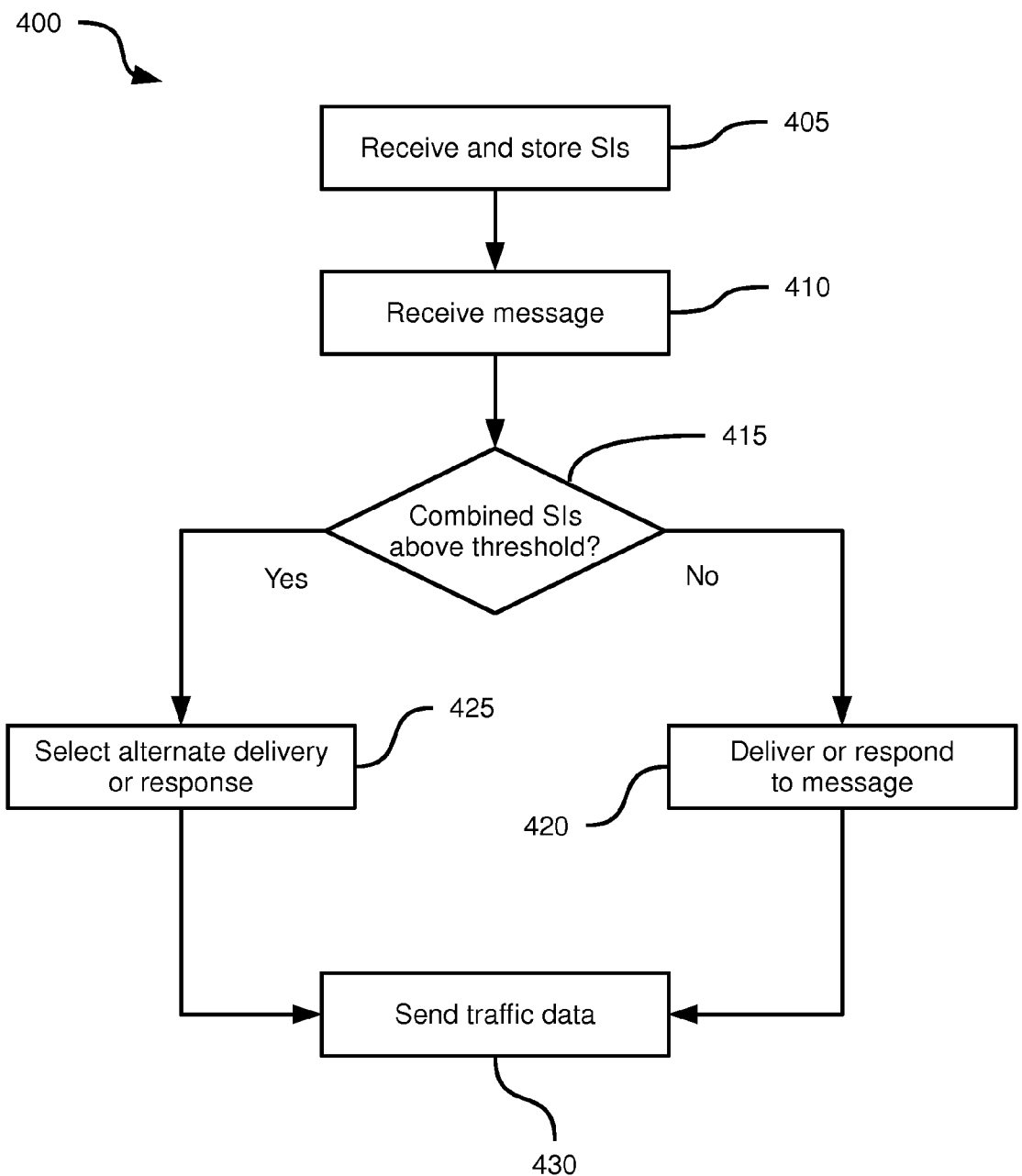
FIG. 4 depicts a method of routing messages, according to a non-limiting embodiment.

Referring now to FIG. 4, a method 400 of routing messages based on SIs is illustrated. Method 400 will be discussed in connection with its performance within system 100, and in particular on messaging server 116.

At block 405, messaging server 116 is configured to receive updated suspicion indices from metrics server 120, following one or more performances of method 300. Messaging server 116 is configured to store the updated SIs in memory 204, specifically in database 212. An example of database 212 is shown below, based on performances of method 300 for each of the sender account identifiers and network addresses shown in Table 2:

TABLE 2

Example Suspicion Indices

| Identifier | Suspicion index |
|---|---|
| 1.2.3.4 | 0.1 |
| 5.6.7.8 | 0.1 |
| 2.3.4.5 | 0.8 |
| 104a | 0.2 |
| 104b | 0.4 |
| 104c | 0.9 |

It is also contemplated that the SIs for network addresses may be stored in a separate database from the SIs for account identifiers. Alternatively, SIs for network addresses may be flagged as such, while SIs for account identifiers may be flagged as such.

At block 410, messaging server 116 is configured to receive a message from a computing device 104. The nature of the message is not particularly limited. For example, the message may be an instant message addressed to another computing device 104. The message may also be a request to register a new account identifier. In a further example, the message may be a lookup request.

Prior to processing the message received at block 410, messaging server 116 can be configured to retrieve two SIs corresponding to the sender of the message from database 212, and to determine whether the total of those two SIs is greater than a predetermined threshold. The two SIs retrieved are the SI for the account that sent the message received at block 410, and the network address from which the message received at block 410 was received. For example, assume that the message received at block 410 was received from account 104c, in use at computing device 104c, and that the network address of computing device 104c in network 108 is 2.3.4.5. At block 415, messaging server 116 would retrieve the SIs of the third and sixth rows of Table 2 (not counting the header row) and add the retrieved SIs together.

If the determination at block 415 is negative (that is, the combined SI for the sender of the incoming message is not above the threshold), messaging server 116 is configured to respond to the message in the usual manner (e.g. by responding to a registration request, routing an instant message to the addressee, and the like) at block 420.

However, if the determination at block 415 is affirmative (that is, the combined SI for the sender of the incoming message is above the threshold), messaging server 116 proceeds instead to block 425. At block 425, messaging server 116 is configured to select an alternate message delivery or response action. A variety of alternate actions are contemplated, examples of which are shown below. Messaging server 116 can be configured to evaluate more than one threshold, and to select one alternate action for a first threshold and a different alternate action for a second, higher threshold. In other embodiments, at block 415 messaging server 116 may evaluate separate thresholds, or separate sets of thresholds, for account SIs and network address SIs, with the final output of block 415 being an indication of the overall likelihood that the message received at block 410 is spam.

Drop:

an instant message received at block 410 may simply be dropped rather than being delivered. In other examples, an instant message received at block 410 and addressed to a plurality of destinations may be dropped for a predefined number or percentage of those destinations (e.g. 90%), and delivered normally for the remainder. In further examples, the message may be delivered only to other accounts with sufficiently elevated SIs, and dropped for any destinations without elevated SIs.

Flag:

an instant message received at block 410 may be delivered to the destination(s), but modified at messaging server 116 to include a flag indicating that the message may be spam. At the receiving computing device 104, such a flag may alter the display of the message, for example, by suppressing alerts (e.g. ring tones) that would normally play on receipt of an instant message.

Redirect:

an instant message containing a web page may be modified by messaging server 116 to replace the webpage with a redirect webpage warning the recipient that the original webpage may contain malicious content. The redirect webpage may contain a link to the original webpage.

Content Modification:

in embodiments in which the content of instant messages is accessible to messaging server 116, messaging server 116 may modify an instant message containing a URL by breaking the URL, for example by inserting or removing one or more characters from the URL. The URL may also be replaced with a URL of the warning webpage mentioned above. Further, instant messages containing images may be modified by messaging server to blur or delete the images.

Challenge:

delivery of an instant message, or response to a registration request or lookup request, may be withheld until the sending computing device 104 has responded to a challenge provided by messaging server 116, such as a CAPTCHA challenge. In other examples, messaging server 116 may transmit a cryptographic problem requiring the sending computing device 104 to solve the problem and return the solution to messaging server 116. If the sender fails to respond to the challenge within a certain time, the message may simply be dropped. It is contemplated that the nature of the response to such challenges may be included in subsequent traffic data (as noted earlier in connection with the description of traffic data contents), and thus may further modify the SIs of the sender. For example, a rapid response time to a cryptographic challenge may indicate the use of an emulator of an instant messaging client running on a server rather than on a mobile device such as a smart phone.

False Registration Response:

messaging server 116 may respond to a registration request by responding that the requested account identifier is not available although, in fact, the requested identifier is available. Such false responses may be stored in memory 204 to allow messaging server 116 to respond consistently to repeated requests.

False Lookup Response:

messaging server 116 may respond to a lookup request by responding that the requested account identifier does not exist although, in fact, the requested identifier does exist. Such false responses may be stored in memory 204 to allow messaging server 116 to respond consistently to repeated requests.

Account Deletion and Address Blocking:

messaging server 116 may delete the account that sent the message received at block 410, preventing any further messages from being sent by that account. Alternatively, messaging server 116 may blacklist the sending network address, instead of or in addition to deleting the sending account.

Rate Limiting:

messaging server 116 can be configured to impose a limit on the rate at which the sender of the message received at block 410 can send further messages. For example, a rate limit of five messages per minute may be imposed on the sender, with any messages in excess of the rate being dropped. In some embodiments, the rate limit can be applied to only certain types of messages. For example, rate limits may be applied only to account registration requests, such that only a certain number of account registration requests from a certain IP address are handled normally per minute (or other suitable time interval), with the remainder being dropped. Messaging server 116 can be configured to apply such rate limits at all times, or only at specific times of day, days of the week, or the like. The time periods over which the rate limits are applied can be set at messaging server 116 to match time periods in which messages determined to be spam are most frequently received.

Having selected and carried out an alternate action at block 425, messaging server 116 is configured to proceed to block 430, at which further traffic data is provided to metrics server 120. The traffic data can include data for both "normal" messages (those processed via block 420) and suspected spam messages (those processed via block 425). The traffic data can also include an indication of how each suspected spam message was handled.

Variations to the above methods and system are contemplated. For example, in some embodiments, metrics server 120 and messaging server 116 may be implemented as a single server performing both methods 300 and 400. In other embodiments, metrics server 120 may perform block 415 and 425, and transmit a handling instruction specifying alternate actions to messaging server 116 instead of messaging server 116 performing block 415 and selecting an alternate action. Messaging server 116 can store such handling instructions and then determine, before delivering or responding to a message received at block 410, whether any handling instructions are present that affect such delivery or response.

In further variations, SIs may be computed as positive values only by metrics server 120, and a single negative value (−1, for example) may be used by an operator of metrics server 120 to manually certify that the relevant identifier is not associated with sending spam. In other variations, SIs may decay towards zero over time in the absence of any activity.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A metrics server, comprising:
   a memory;
   a network interface connecting the metrics server to a messaging server configured to deliver messages containing message content from a first communication device to at least one other communication device; and
   a processor interconnected with the memory and the network interface, and operating to:
      receive, from the messaging server via the network interface, traffic data associated with the first communication device and including (i) an account identifier of the first communication device, and (ii) a network address of the first communication device, the traffic data excluding the message content;
      update, based on the traffic data, a first suspicion index corresponding to the account identifier of the first communication device and a second suspicion index corresponding to the network address of the first communication device, the first suspicion index indicating a likelihood that messages originating from the account identifier are spam messages, and the second suspicion index indicating a likelihood that messages originating from the network address are spam messages; and
      transmit the first suspicion index and the second suspicion index to the messaging server.

2. The metrics server of claim 1, the processor further configured to update at least one of the first suspicion index and the second suspicion index by:
   retrieving a plurality of detection characteristics from the memory;
   for each detection characteristic:
      determining whether the traffic data matches the detection characteristic; and
      when the determination is affirmative, incrementing or decrementing the at least one of the first suspicion index and the second suspicion index.

3. The metrics server of claim 2, the processor further configured to update the at least one of the first suspicion index and the second suspicion index by:
   retrieving a plurality of weightings each corresponding to a respective detection characteristic; and
   incrementing or decrementing the at least one of the first suspicion index and the second suspicion index by applying the weighting corresponding to each detection characteristic determined to match the traffic data.

4. The metrics server of claim 2, the detection characteristics including at least one of a message frequency, a shared network address, a shared account identifier, and a number of spam reports associated with the first communication device.

5. The metrics server of claim 1, the traffic data including at least one of an account identifier of the other communication device, a timestamp, a word count for at least one message, and a number of spam reports associated with the first communication device.

6. A messaging server, comprising:
   a memory;
   a network interface connecting the messaging server to a metrics server; and
   a processor interconnected with the memory and the network interface, and operating to:
      receive a first suspicion index corresponding to an account of a sender and a second suspicion index corresponding to a network address of the sender from the metrics server and store the first and second suspicion indices in the memory;
      receive a message from the sender, the message containing message content and addressed to a destination;
      determine whether a combination of the first and second suspicion indices corresponding to the sender is greater than a predefined threshold; and
      when the determination is affirmative, select an alternate delivery or response to the message.

7. The messaging server of claim 6, the processor further configured to transmit traffic data derived from the message to the metrics server.

8. The messaging server of claim 6, the processor further configured to route the message to the destination when the determination is negative.

9. The messaging server of claim 6, the processor further configured to select an alternative delivery or response from the group consisting of:
   dropping the message;
   delivering the message to the destination with a flag indicating that the message may be spam;
   modifying content of the message and delivering the modified message to the destination; and
   transmitting a challenge to the sender.

10. A method in a system configured to deliver messages containing message content from a first communication device to at least one other communication device, comprising:
   receiving traffic data associated with the first communication device and including (i) an account identifier of the first communication device, and (ii) a network address of the first communication device, the traffic data excluding the message content;
   updating, based on the traffic data, a first suspicion index corresponding to the account identifier of the first communication device and a second suspicion index corresponding to the network address of the first communication device, the first suspicion index indicating a likelihood that messages originating from the account identifier are spam messages, and the second suspicion index indicating a likelihood that messages originating from the network address are spam messages; and storing the first suspicion index and the second suspicion index in a memory.

11. The method of claim 10, further comprising:

receiving a message from the first communication device, the message containing message content and addressed to another communication device;

determining whether a combination of the first suspicion index and the second suspicion index is greater than a predefined threshold; and when the determination is affirmative, select an alternate delivery or response to the message.

12. The method of claim 10, further comprising:

retrieving a plurality of detection characteristics from the memory;

for each detection characteristic:

determining whether the traffic data matches the detection characteristic; and when the determination is affirmative, incrementing or decrementing at least one of the first suspicion index and the second suspicion index.

13. The method of claim 12, further comprising:

retrieving a plurality of weightings each corresponding to a respective detection characteristic; and incrementing or decrementing the at least one of the first suspicion index and the second suspicion index by applying the weighting corresponding to each detection characteristic determined to match the traffic data.

14. The method of claim 12, the detection characteristics including at least one of a message frequency, a shared network address, a shared account identifier, and a number of spam reports associated with the first communication device.

15. The method of claim 10, the traffic data including at least one of an account identifier of the other communication device, a timestamp, a word count for at least one message, and a number of spam reports associated with the first communication device.

16. The method of claim 10, further comprising: transmitting the first and second suspicion indices to a messaging server.

* * * * *